(12) United States Patent
Ash

(10) Patent No.: US 10,105,780 B2
(45) Date of Patent: Oct. 23, 2018

(54) METHOD AND SYSTEM OF USING A CONSUMABLE AND A HEAT SOURCE WITH A WELD PUDDLE

(71) Applicant: LINCOLN GLOBAL, INC., Santa Fe Springs, CA (US)

(72) Inventor: Elliott Ash, Bay Village, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 0 days.

(21) Appl. No.: 15/648,722

(22) Filed: Jul. 13, 2017

(65) Prior Publication Data

US 2017/0304923 A1 Oct. 26, 2017

Related U.S. Application Data

(63) Continuation-in-part of application No. 15/601,550, filed on May 22, 2017, which is a continuation of
(Continued)

(51) Int. Cl.
*B23K 9/095* (2006.01)
*B23K 26/24* (2014.01)
(Continued)

(52) U.S. Cl.
CPC ............ *B23K 9/095* (2013.01); *B23K 9/1093* (2013.01); *B23K 26/14* (2013.01); *B23K 26/21* (2015.10);
(Continued)

(58) Field of Classification Search
CPC ...... B23K 9/095; B23K 26/24; B23K 26/342; B23K 35/0261; B23K 26/322; B23K 26/211; B23K 26/14; B23K 9/1093
(Continued)

(56) References Cited

U.S. PATENT DOCUMENTS 3,417,223 A * 12/1968 Steigerwald ....... B23K 15/0046
219/121.14
3,775,581 A 11/1973 Sciaky
(Continued)

FOREIGN PATENT DOCUMENTS

| EP | 0664181 A1 | 7/1995 |
|----|------------|--------|
| JP | 2-99286 A | 4/1990 |
| JP | 2004-330299 A | 11/2004 |

OTHER PUBLICATIONS

International Search Report and Written Opinion for International Application No. PCT/IB2013/001464 dated Dec. 5, 2013, 9 pages.

*Primary Examiner* — Samuel M Heinrich
(74) *Attorney, Agent, or Firm* — Perkins Coie LLP

(57) ABSTRACT

A system for and a method of controlling a filler wire and/or an heat source is provided. The system includes a high intensity energy source configured to heat at least one workpiece to create a molten puddle on a surface of the at least one workpiece. A filler wire feeder is configured to feed a filler wire into said molten puddle, and a travel direction controller is configured to advance the high intensity energy source and the filler wire in a travel direction to deposit the filler wire on the at least one workpiece. The system also includes a controller configured to move the filler wire and/or the energy source in at least a first direction during the feeding and advancing of the filler wire. At least the first direction is controlled to obtain a desired shape, profile, height, size, or admixture of a bead formed by the molten puddle.

26 Claims, 6 Drawing Sheets

Related U.S. Application Data application No. 13/790,868, filed on Mar. 8, 2013, now Pat. No. 9,687,929.

(60) Provisional application No. 61/668,818, filed on Jul. 6, 2012.

(51) Int. Cl.

| | | |
|---|---|---|
| B23K 26/342 | (2014.01) | |
| B23K 26/322 | (2014.01) | |
| B23K 26/211 | (2014.01) | |
| B23K 26/14 | (2014.01) | |
| B23K 9/10 | (2006.01) | |
| B23K 35/02 | (2006.01) | |
| B23K 26/34 | (2014.01) | |
| B23K 26/21 | (2014.01) | |
| B23K 26/70 | (2014.01) | |
| B23K 26/60 | (2014.01) | |
| B23K 101/34 | (2006.01) | |
| B23K 103/08 | (2006.01) | |

(52) U.S. Cl.
CPC ............ *B23K 26/211* (2015.10); *B23K 26/24* (2013.01); *B23K 26/322* (2013.01); *B23K 26/34* (2013.01); *B23K 26/342* (2015.10); *B23K 26/60* (2015.10); *B23K 26/702* (2015.10); *B23K 35/0261* (2013.01); *B23K 2201/34* (2013.01); *B23K 2203/08* (2013.01)

(58) Field of Classification Search
USPC ........................................ 219/121.63, 121.64
See application file for complete search history.

(56) References Cited

U.S. PATENT DOCUMENTS

| | | | |
|---|---|---|---|
| 3,993,889 A | * | 11/1976 | Sciaky ................. B23K 15/02 219/121.29 |
| 4,580,026 A | | 4/1986 | Stol |
| 4,803,334 A | | 2/1989 | Burke |
| 6,342,688 B1 | | 1/2002 | Israel |
| 6,521,861 B2 | | 2/2003 | Jones |
| 8,536,483 B2 | | 9/2013 | Thomas |
| 2002/0117485 A1 | | 8/2002 | Jones et al. |
| 2010/0326969 A1 | | 12/2010 | Tsukamoto et al. |
| 2011/0132878 A1 | | 6/2011 | Wang et al. |
| 2011/0297658 A1 | | 12/2011 | Peters et al. |

* cited by examiner

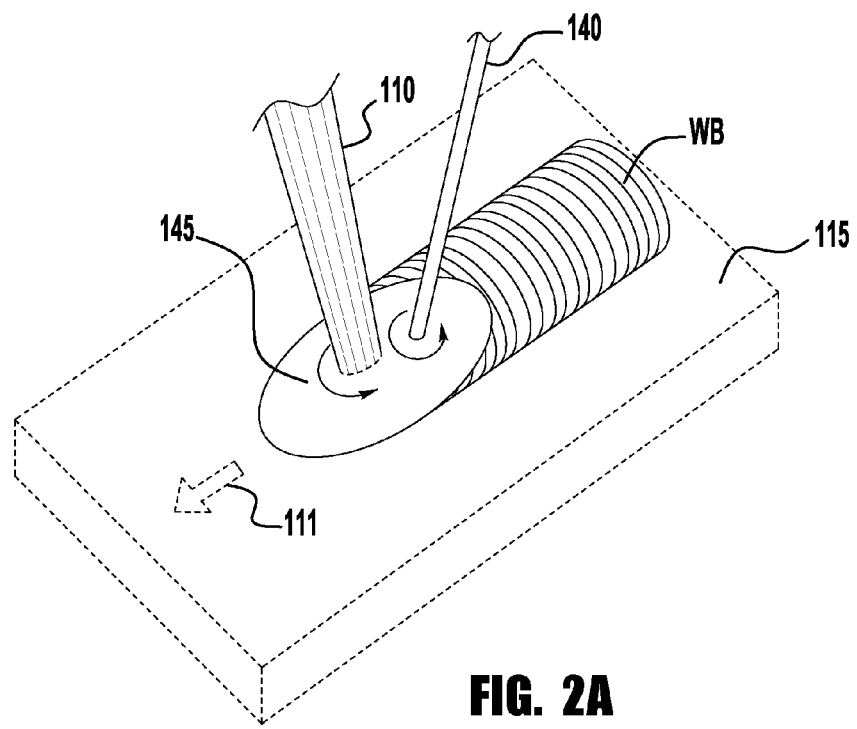
FIG. 2A
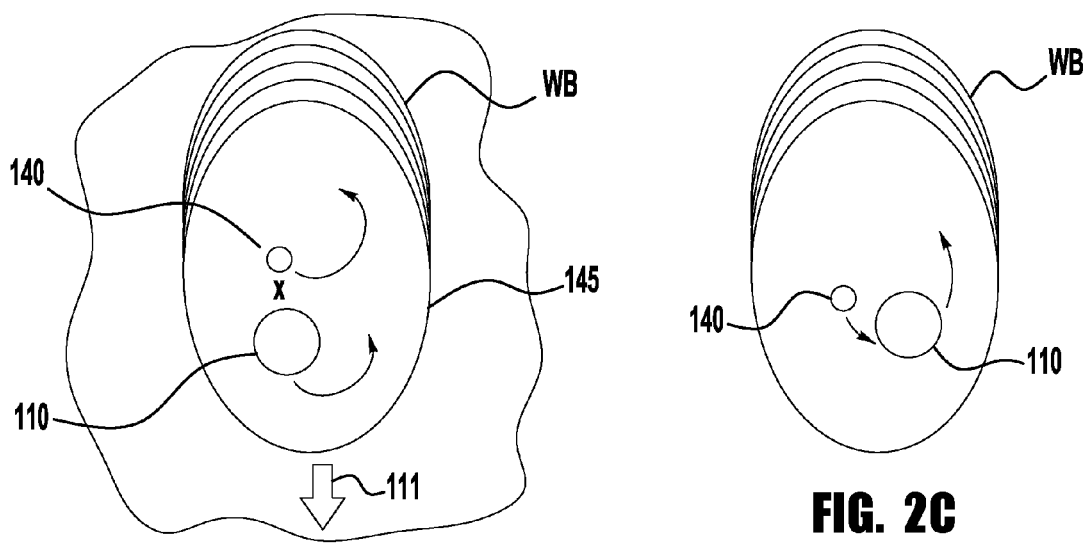
FIG. 2B
FIG. 2C

METHOD AND SYSTEM OF USING A CONSUMABLE AND A HEAT SOURCE WITH A WELD PUDDLE

PRIORITY

This is a Continuation in Part application of U.S. patent application Ser. No. 15/601,550, filed on May 22, 2017, which is a Continuation of Application of U.S. patent application Ser. No. 13/790,868, filed on Mar. 8, 2013 (now U.S. Pat. No. 9,687,929), which claims priority to U.S. Provisional Patent Application No. 61/668,818, which are incorporated herein by reference in their entirety.

TECHNICAL FIELD

Certain embodiments relate to using filler wire and/or a heat source in overlaying, welding and joining applications. More particularly, certain embodiments relate to controlling the filler wire and/or a heat source in a system and method for any of brazing, cladding, building up, filling, hard-facing overlaying, joining and welding applications.

BACKGROUND

The traditional filler wire method of welding (e.g., a gas-tungsten arc welding (GTAW) filler wire method) provides increased deposition rates and welding speeds over that of traditional arc welding alone. The filler wire, which leads a torch, is resistance-heated by a separate power supply. The wire is fed through a contact tube toward a workpiece and extends beyond the tube. The extension is resistance-heated such that the extension approaches or reaches the melting point and contacts the weld puddle. A tungsten electrode may be used to heat and melt the workpiece to form the weld puddle. The power supply provides a large portion of the energy needed to resistance-melt the filler wire. In some cases, the wire feed may slip or falter and the current in the wire may cause an arc to occur between the tip of the wire and the workpiece. The extra heat of such an arc may cause burn through and spatter. In addition, because the traditional filler wire method uses an arc to transfer the filler material to the weld, it may be difficult to get the desired weld profile and/or control the cooling rate of the weld puddle.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise controlling filler wire in a system and method for any of brazing, cladding, building up, filling, hard-facing overlaying, welding, and joining applications. In some embodiments, the method includes heating at least one workpiece with a high energy heat source to create a molten puddle on a surface of the at least one workpiece and feeding a filler wire into the molten puddle. The method also includes advancing each of the high energy heat source and the filler wire in a travel direction to deposit the filler wire on the at least one workpiece. The filler wire and/or heat source is moved in at least a first direction during the feeding and advancing of the filler wire, where the at least first direction is different from the travel direction. The method further includes controlling at least the movement of the filler wire and/or heat source in the at least first direction to obtain a desired shape, profile, height, size, or an admixture of a bead formed by the molten puddle.

In some embodiments, the system includes a high intensity energy source configured to heat at least one workpiece to create a molten puddle on a surface of the at least one workpiece. A filler wire feeder is configured to feed a filler wire into the molten puddle. A travel direction controller is configured to advance each of the high intensity energy source and the filler wire in a travel direction to deposit the filler wire on the at least one workpiece. The system also includes a controller configured to move the filler wire and/or the energy source in at least a first direction during the feeding and advancing of the filler wire, where the at least first direction is different from said travel direction. At least the movement of the filler wire and/or the energy source in the at least first direction is controlled to obtain a desired shape, profile, height, size, or an admixture of a bead formed by the molten puddle.

The method also includes applying energy from a high intensity energy source to the workpiece to heat the workpiece at least while applying the flow of heating current. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIGS. 2A-2C illustrate a method of controlling a filler wire that can be used by the system of FIG. 1;

DETAILED DESCRIPTION

Figure 1:
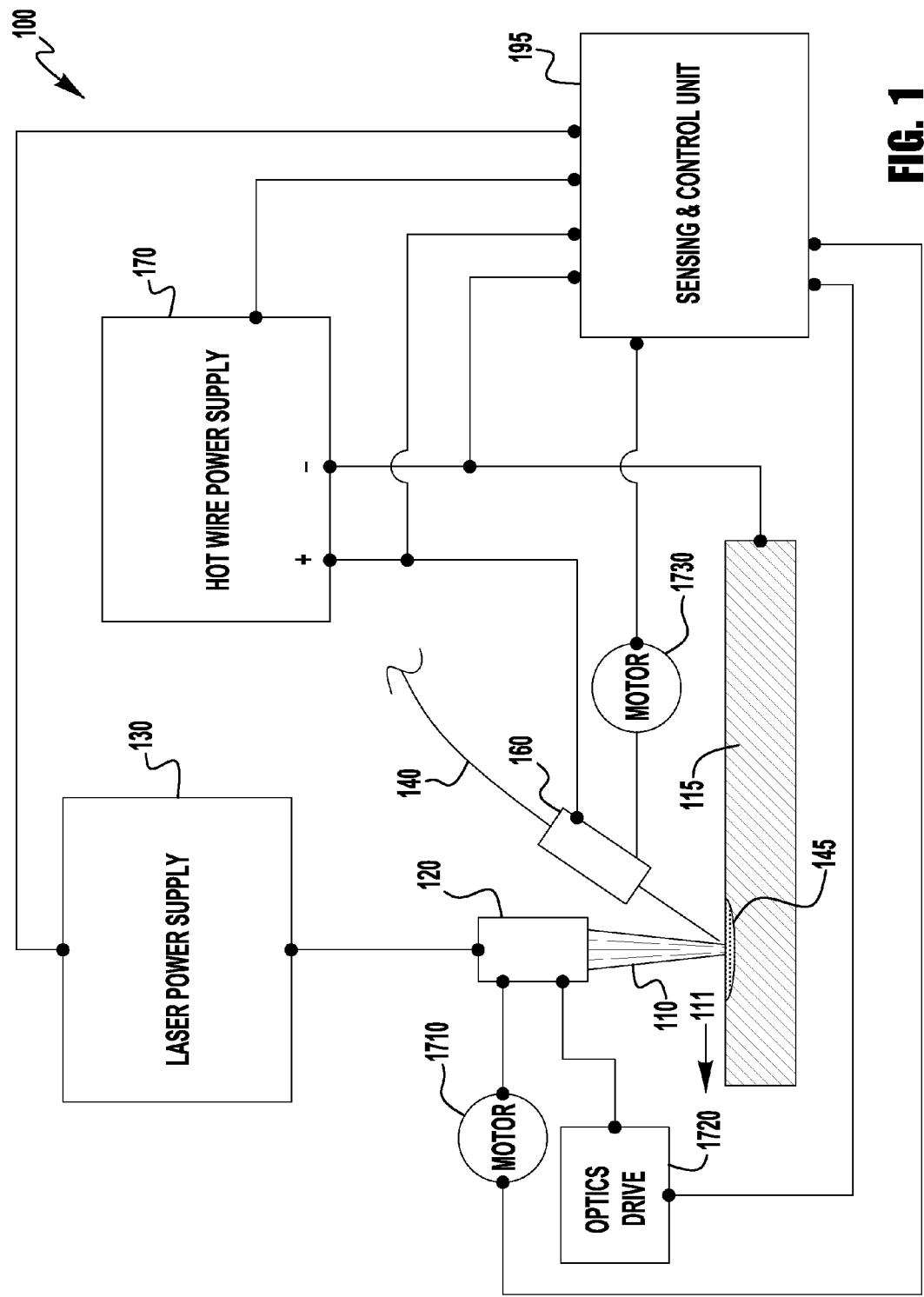
FIG. 1 illustrates a functional schematic block diagram of an exemplary embodiment of a combination filler wire feeder and energy source system for any of brazing, cladding, building up, filling, hard-facing overlaying, joining, and welding applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is known that welding/joining operations typically join multiple workpieces together in a welding operation where a filler metal is combined with at least some of the workpiece metal to form a joint. Because of the desire to increase production throughput in welding operations, there is a constant need for faster welding operations, which do not result in welds which have a substandard quality. This is also true for cladding/surfacing operations, which use similar technology. It is noted that although much of the following discussions will reference "welding" operations and systems, embodiments of the present invention are not just limited to joining operations, but can similarly be used for cladding, brazing, overlaying, etc.—type operations. Furthermore, there is a need to provide systems that can weld quickly under adverse environmental conditions, such as in remote work sites. As described below, exemplary embodiments of the present invention provide significant advantages over existing welding technologies. Such advantages include, but are not limited to, using multiple filler wires, adjusting weld profiles, controlling the cooling rate of the weld puddle, reduced total heat input resulting in low distortion of the workpiece, very high welding travel speeds, very low spatter rates, welding with the absence of shielding, welding plated or coated materials at high speeds with little or no spatter, and welding complex materials at high speeds.

FIG. 1 illustrates a functional schematic block diagram of an exemplary embodiment of a combination filler wire feeder and energy source system 100 for performing any of brazing, cladding, building up, filling, hard-facing overlaying, and joining/welding applications. The system 100 includes a laser subsystem 130/120 capable of focusing a laser beam 110 onto a workpiece 115 to heat the workpiece 115 and form a weld puddle 145. The laser subsystem is a high intensity energy source. The laser subsystem can be any type of high energy laser source, including but not limited to carbon dioxide, Nd:YAG, Yb-disk, YB-fiber, fiber delivered or direct diode laser systems. Further, even white light or quartz laser type systems can be used if they have sufficient energy. Other embodiments of the system may include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source. The following specification will repeatedly refer to the laser system, beam and power supply, however, it should be understood that this reference is exemplary as any high intensity energy source may be used. For example, a high intensity energy source can provide at least 500 W/cm$^2$.

It should be noted that the high intensity energy sources, such as the laser devices 120 discussed herein, should be of a type having sufficient power to provide the necessary energy density for the desired welding operation. That is, the laser device 120 should have a power sufficient to create and maintain a stable weld puddle throughout the welding process, and also reach the desired weld penetration. For example, for some applications lasers should have the ability to "keyhole" the workpieces being welded. This means that the laser should have sufficient power to fully penetrate the workpiece, while maintaining that level of penetration as the laser travels along the workpiece. Exemplary lasers should have power capabilities in the range of 1 to 20 kW, and may have a power capability in the range of 5 to 20 kW. Higher power lasers can be utilized, but can become very costly.

The laser subsystem 130/120 includes a laser device 120 and a laser power supply 130 operatively connected to each other. The laser power supply 130 provides power to operate the laser device 120. Laser device 120 allows for precise control of the size and depth of the weld puddle 145 as the laser beam 110 can be focused/de-focused easily or have its beam intensity changed very easily. Because of these abilities the heat distribution on the workpiece 115 can be precisely controlled. This control allows for the creation of a very narrow weld puddle for precise welding as well as minimizing the size of the weld zone on the workpiece 115.

The system 100 also includes a filler wire feeder subsystem capable of providing at least one resistive filler wire 140 to make contact with the workpiece 115 in the vicinity of the laser beam 110. Of course, it is understood that by reference to the workpiece 115 herein, the molten puddle, i.e., the weld puddle 145, is considered part of the workpiece 115, thus reference to contact with the workpiece 115 includes contact with the puddle 145. The filler wire feeder subsystem includes a filler wire feeder 150, a contact tube 160, and a wire power supply 170. During operation, the filler wire 140 is resistance-heated by electrical current from the power supply 170 which is operatively connected between the contact tube 160 and the workpiece 115. In accordance with an embodiment of the present invention, the power supply 170 is a pulsed direct current (DC) power supply, although alternating current (AC) or other types of power supplies are possible as well. In some exemplary embodiments, the filler wire 140 is preheated by power supply 170 to at or near its melting point. Accordingly, its presence in the weld puddle 145 will not appreciably cool or solidify the puddle 145 and the filler wire 145 is quickly consumed into the weld puddle 145.

The power supply 170, filler wire feeder 150, and laser power supply 130 may be operatively connected to sensing and control unit 195. The control unit 195 can control the welding operations such as wire feed speed, wire temperatures, and weld puddle temperature—to name just a few. To accomplish this, the control unit 195 can receive inputs such as the power used by power supplies 130 and 170, the voltage at contact tube 160, the heating current(s) through the filler wire(s), the desired and actual temperature(s) for the filler wire(s), etc. U.S. patent application Ser. No. 13/212,025, titled "Method And System To Start And Use Combination Filler Wire Feed And High Intensity Energy Source For Welding," filed Aug. 17, 2011, is incorporated by reference in its entirety, describes exemplary sensing and control units, including exemplary monitoring and control methodologies, that may be incorporated in the present invention.

In exemplary embodiments of the present invention, the weld profile, i.e., the shape and/or size of the weld puddle 145, can be changed by controlling the movement of the wire 140 relative to the weld puddle 145. As illustrated in FIG. 1, the impact location of the filler wire 140 in the weld puddle 145 may be controlled by filler wire motor 1730, which controls contact tube 160. The motor 1730 moves or translates the contact tube 160 such that the position of the wire 140 relative to the weld puddle 145 is moved during welding. In an exemplary embodiment, the filler wire 140 impacts the weld puddle 145 at the same location as the laser beam 110. In such cases, the laser beam 110 may aid in melting the filler wire 140. However, in other exemplary embodiments, the filler wire 140 can impact the same weld puddle 145 remotely from the laser beam 110. Of course, when an arc-type heating subsystem is used instead of a laser subsystem, the filler wire 140 impacts the weld puddle 145 remotely from the arc. In some exemplary embodiments, the filler wire motor 1730 will control contact tube 160 such that the movement of wire 140 within the weld puddle 145 is coordinated with the movement of laser beam 110. In this regard, the motor 1730 may be operatively connected to and communicate with the sensing and control unit 195 and/or directly with laser motion control subsystem 1710/1720. The laser motion control subsystem 1710/1720 includes motor 1710 and optics drive unit 1720. The motor 1710 moves or translates the laser 120 such that the position of the beam 110 relative to the weld puddle 145 is moved during welding. That is, while the laser beam 110 and wire 140 are moved relative to the workpiece 115 during the welding process (i.e., the direction of the weld (see arrow 111)), the laser beam 110 can also be moved relative to the weld puddle 145. For example, based on the welding parameters, the motor 1710 can translate the beam 110 back and forth in-line with the direction of the weld, back and forth along the width of the weld, in a circular pattern, in an elliptical pattern, etc. Alternatively, or in addition to moving the laser beam 110, the optics drive unit 1720 can control the optics of the laser 120, which control the shape and/or intensity of laser beam 110. For example, the optics drive unit 1720 can cause the focal point of the beam 110 to move or change relative to the surface of the workpiece 115, thus changing the penetration or depth of the weld puddle 145. In some exemplary embodiments, the optics drive unit 1720 can cause the optics of the laser 120 to change the shape of the beam 110 and, thus the shape of weld puddle 145. The operation of the laser motion control subsystem 1710/1720 is further discussed U.S. patent application Ser. No. 13/212,025, titled "Method And System To Start And Use Combination Filler Wire Feed And High Intensity Energy Source For Welding," filed Aug. 17, 2011, and incorporated by reference in its entirety.

By being able to move the wire 140 relative to the puddle, embodiments of the present invention are capable of adjusting the shape, profile and height of the puddle, as well as obtaining the desired weld puddle admixture during welding. For example, if the weld puddle 145 is relatively large due, the movement of the wire 140 will allow the wire 140 to be deposited and distributed relatively evenly throughout the puddle 145 during welding/cladding. Moreover, it may be desirable to deliver the 140 to certain portions of the puddle 145 at different times during the operation. Embodiments of the present invention allow this to occur by delivering the wire 140 to the proper location in the puddle 145 at the appropriate time. Further, mixing of the weld puddle can be enhanced by moving the wire 140 relative to the puddle during the operation.

In some exemplary embodiments, the sensing and control unit 195 may synchronize the movement of the wire 140 using the motor 1730 with that of laser beam 110. In an exemplary embodiment, as illustrated in FIGS. 2A and 2B, the laser beam 110 and wire 140 are both moved in a circular pattern by motors 1710 and 1730, respectively. The relative position of wire 140 with respect to beam 110 can be adjusted by motor 1730 to ensure that, as the beam 110 and wire 140 move forward in the direction of the weld (see arrow 111), the wire 140 impinges the weld puddle 145 at a point where the puddle 145 is at its optimum temperature. For example, as shown in FIG. 2B, the wire 140 will impinge point X on weld puddle 145 immediately after the beam 110 heats it. Thus, embodiments of the present invention can have the wire 140 follow the movement of the beam 110 (or other heat source) to optimize absorption of the wire 140 into the puddle 145, which is generally shown in FIG. 2C. Of course, the exact timing on the optimum impingement point may vary depending on the temperature of the weld puddle 145, the intensity of laser beam 110, the type of filler wire 140, the feed speed of the filler wire 140, etc.

Figure 3A:
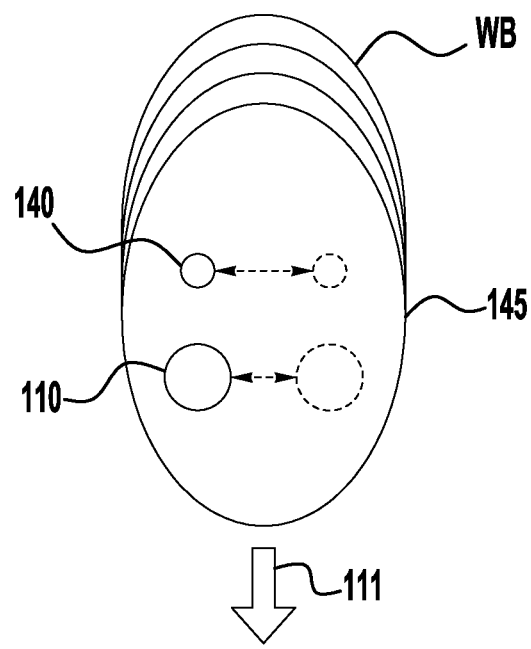
FIGS. 3A and 3B illustrate a method of controlling a filler wire that can be used by the system of FIG. 1.
Figure 3B:
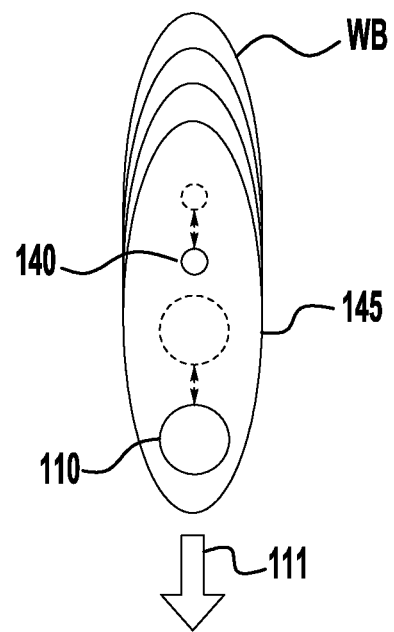

In addition, the wire 140 and the laser beam 110 may follow other patterns and their movements need not be synchronized. For example, FIGS. 3A and 3B illustrates an embodiment in which the laser beam 110 and the filler wire 140 are translated back-and-forth along a single line. Depending on whether the beam 110 and wire 140 are translated across the width of the weld puddle 145 (FIG. 3A) or in-line with the weld puddle (FIG. 3B), these embodiments can be used to either elongate or widen the puddle 145 as needed depending on the desired shape of the weld. Of course numerous other patterns are possible. For example, the beam 110 and the wire 140 can be translated in an elliptical pattern in the weld puddle 145 rather than the circular pattern shown in FIGS. 2A and 2B. Of course, any combination of such patterns can be used to either elongate or widen the weld puddle 145 as needed to get the desired weld profile. In addition, U.S. patent application Ser. No. 13/212,025, titled "Method And System To Start And Use Combination Filler Wire Feed And High Intensity Energy Source For Welding," filed Aug. 17, 2011, and incorporated by reference in its entirety, provides additional patterns that may be used in the present invention.

In some embodiments, the motion of the wire 140 is independent of the motion of the laser beam 110. That is, the patterns of the laser beam 110 and the wire 140 need not be the same. For example, the laser beam 110 may have an elliptical pattern while the wire 140 has a circular or back-and-forth pattern. In still other embodiments, the laser beam 110 can remain stationary with respect to the weld puddle 145, and only the wire 140 is moved or translated relative to the weld puddle 145.

In some exemplary embodiments of the present invention, the filler wire 140 may be used to control the rate of cooling for the weld puddle 145. For example, the filler wire 140 may be cooler than the weld puddle 145 in order to cool and solidify the weld. Such a welding system may be advantageous in out-of-position welding because the weld puddle 145 will start to cool and solidify before it can sag or spill out of the weld joint. However, to prevent undesirable localized (or uneven) cooling or solidification within the weld puddle 145, motor 1730 can move the wire 140 as discussed above to ensure that the cooler filler wire 140 is spread evenly throughout the weld puddle 145. Conversely, in some welding operations, it may be desirable to have the filler wire 140 hotter than the weld puddle 145 in order to prevent the weld puddle 145 from cooling or solidifying too quickly. Again, the filler wire 140 may be moved by motor 1730 to keep the temperature of weld puddle 145 uniform.

In the embodiment shown in FIGS. 2A-3B, the filler wire 140 trails the beam 110 during the welding operation. However, that is not necessary as the filler wire 140 can be positioned in the leading position. Further, it is not necessary to have the wire 140 in line with the beam 110 in the travel direction, but the wire can impinge the puddle from any direction so long as the filler wire 140 impacts the same weld puddle 145 as the beam 110.

In the embodiments discussed above, only one filler wire was used. However, the present invention is not limited to directing a single filler wire to the weld puddle 145. Unlike most welding processes the filler wire 140 makes contact and is plunged into the weld puddle 145 during the welding process. This is because this process does not use a welding arc to transfer the filler wire 140 but rather simply melts the filler wire 140 into the weld puddle 145. Because no welding arc is generated in the welding process described herein, more than one filler wire can be directed to any one weld puddle, i.e. the feeder subsystem may be capable of simultaneously providing one or more filler wires. By increasing the number of filler wires to a given weld puddle the overall deposition rate of the weld process can be significantly increased without a significant increase in heat input. Thus, it is contemplated that open root weld joints can be filled in a single weld pass. In addition, along with the deposition rate of the filler wire, the shape and characteristics of the weld can be changed as desired by using additional filler wires. To the extent multiple filler wires are utilized, and both are heated as described herein, embodiments of the present invention can utilize a single power supply 170 for each wire.

Figure 4A:
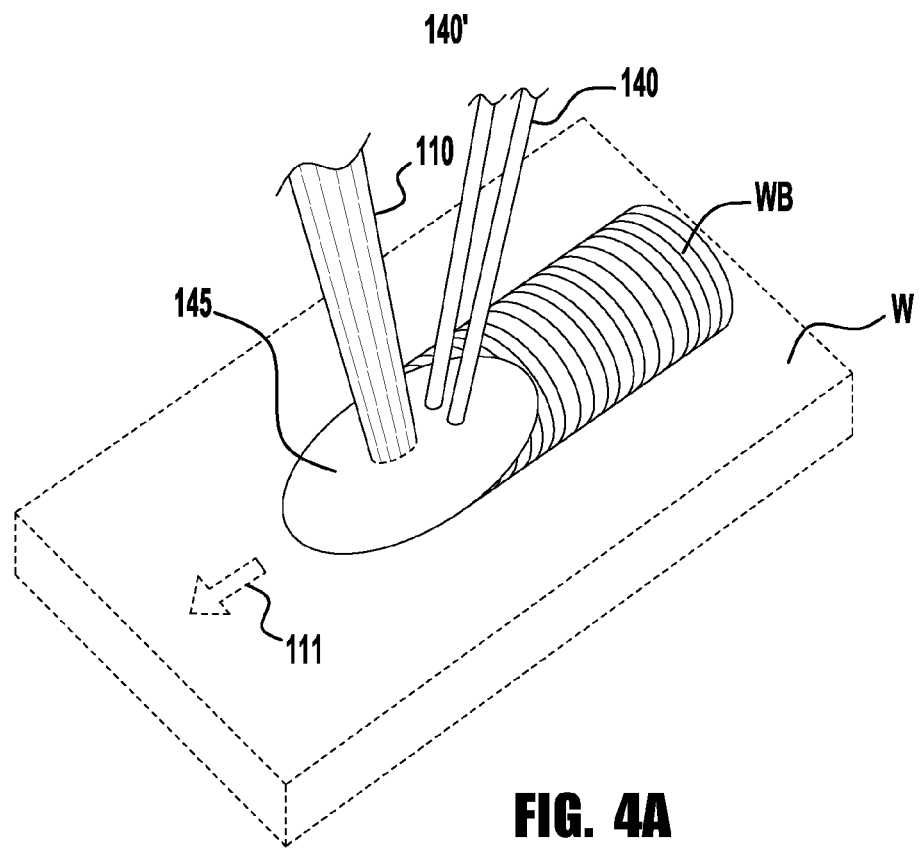
FIGS. 4A and 4B illustrate a method of controlling filler wires that can be used by the system of FIG. 1.
Figure 4B:
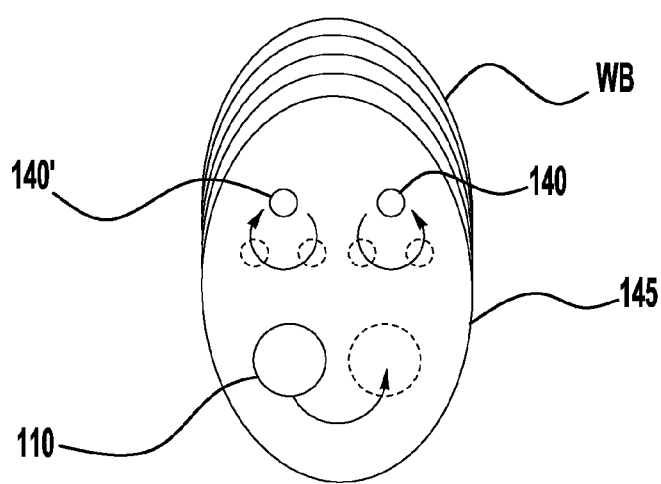

In some exemplary embodiments, as illustrate in FIGS. 4A and 4B, two filler wires impinge weld puddle 145. Embodiments where two or more filler wires are used are similar to the embodiments discussed above. Accordingly, for brevity, only the relevant differences will be discussed. As shown in FIGS. 4A and 4B, the second filler wire 140' impinges the weld puddle 145 in-line with the wire 140 in the width direction. However, this configuration is not limiting and wire 140' may impinge the puddle 145 in-line with wire 140 in the direction of the weld (see arrow 111). Of course, the wires 140 and 140' need not be in the trailing position as shown in FIGS. 4A and 4B, and either wire 140' or 140 or both may be in the leading position during welding operations. Wire 140' may be composed of the same material as wire 140 or it may be composed of a different material depending on the desired weld. For example, wire 140' may be used for hard-facing and/or providing corrosion resistance to the workpiece, and wire 140 may be used to add structure to the workpiece.

In some exemplary embodiments, wire 140' may be controlled by a motor in a manner similar to wire 140 as discussed above. For example, as shown in FIGS. 4A and 4B, wire 140' is being moved in a clockwise pattern by a motor (not shown) and wire 140 in a counter-clockwise pattern. The movements of wires 140 and 140' can be controlled as discussed above to achieve the desired weld shape. Of course, the wires are not limited to circular patterns or to moving in opposite directions (i.e., clockwise and counter-clockwise). The wires 140 and 140' can be controlled using any combination of the patterns discussed above to achieve the desired weld profile.

In some embodiments, the second filler wire may be used to control the temperature of the weld 145. For example, the feed rate and/or the temperature of the second filler may be controlled based on the desired temperature of the weld puddle 145. Similar to the exemplary embodiments discussed above, the second filler wire may be cooler or hotter than the weld puddle temperature and wire 140' may be controlled to ensure that the temperature of weld 145 is uniform.

In FIG. 1, the laser power supply 130, hot wire power supply 170 and sensing and control unit 195 are shown separately for clarity. However, in embodiments of the invention these components can be made integral into a single welding system. Aspects of the present invention do not require the individually discussed components above to be maintained as separately physical units or stand alone structures.

Figure 5A:
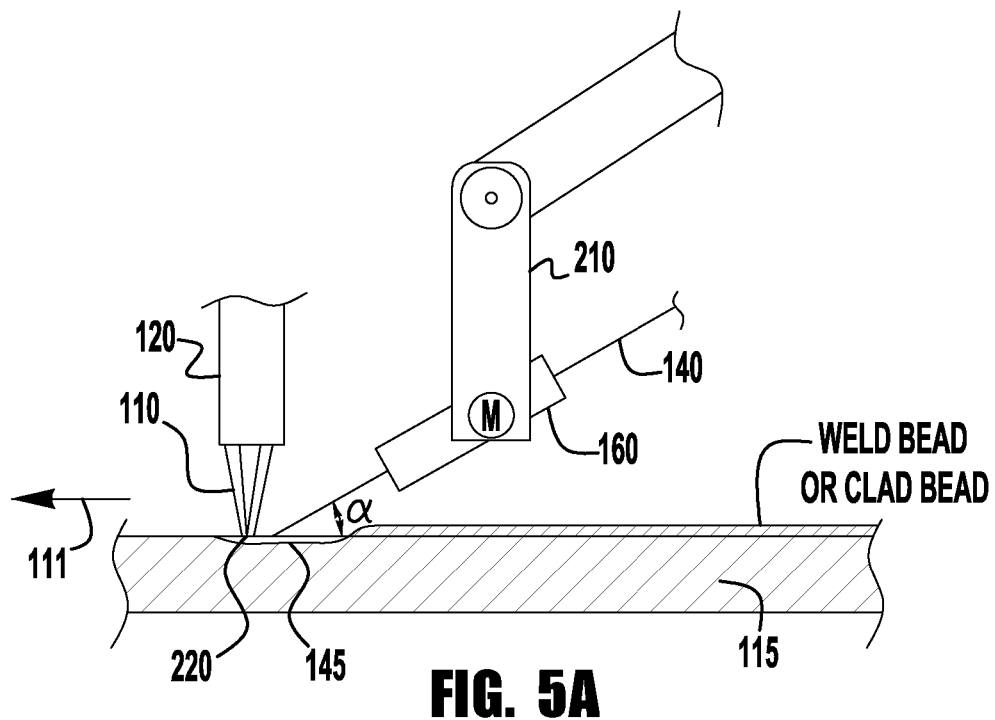
FIGS. 5A and 5B illustrate a block diagram of an exemplary embodiment of an apparatus to control angular and offset movements of the contact tube in the system of FIG. 1.
Figure 5B:
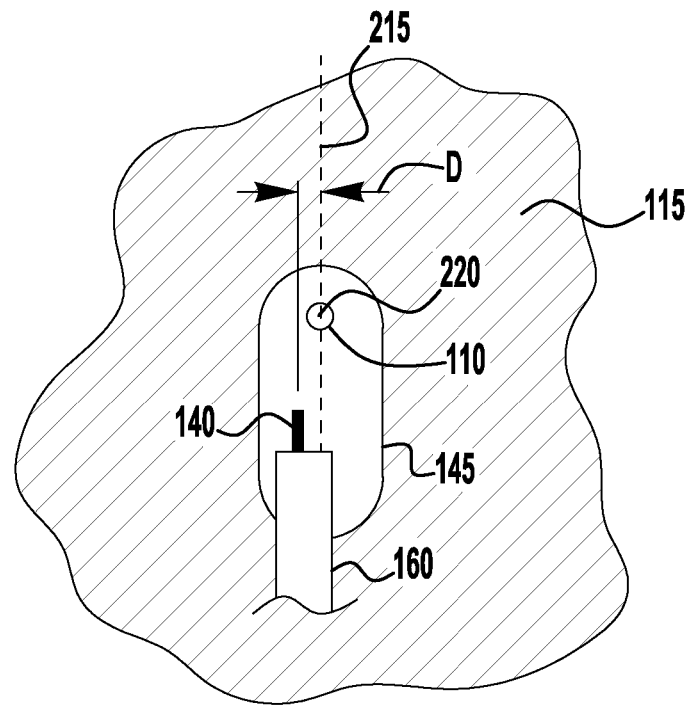

In some exemplary embodiments, the wire feed subsystem can be configured to orient the contact tube 160 such that the filler wire 140 can enter the weld puddle 145 at an angle with respect to the surface of the weld puddle 145 and with a sideways displacement or offset with respect to the weld joint groove. As seen in FIGS. 5A and 5B, the contact tube 160 can be oriented such that the wire 140 enters the weld puddle at a vertical angle $\alpha$ and/or with an offset D. For example, the contact tube 160 can be connected to or be incorporated into a robotic arm 210 that adjust the orientation of the filler wire 140 as it enters the weld puddle 145. The robotic arm 210 can be configured to rotate or position the contact tube 160 in a direction such that the wire 140 enters the weld puddle 145 at a desired vertical angle $\alpha$ and/or at an offset D to precisely control the location and orientation of the filler wire 140 as it enters the weld puddle 145. The vertical angle $\alpha$ of the contact tube 160 can be rotated or positioned manually and/or via the robotic arm 210, which can be controlled, e.g., by sensing and control unit 195 (see FIG. 1). Similarly, the sideways displacement or offset D of the contact tube 160 can be controlled manually and/or via the robotic arm 210, which can be controlled, e.g., by sensing and control unit 195. Of course, the robotic arm 210 is exemplary and other means can be used to set and/or adjust the contact tube 160 as desired.

The angle $\alpha$ can range between slightly greater than 0 degrees (i.e., an angle slightly greater than parallel to the top surface of the weld puddle 145) to 90 degrees (i.e., the wire 140 enters the weld puddle 145 perpendicular to the surface of the weld puddle). The angle $\alpha$ can be set and/or adjusted, e.g., manually and/or via robotic arm 210 and controller 195 to obtain the desired shape, profile, height, size, or admixture of the weld bead WB (or clad bead) formed by the molten puddle 145. In addition, the angle $\alpha$ can be set and/or adjusted, e.g., manually and/or via robotic arm 210 and controller 195 to obtain the desired depth of penetration of the filler wire 140 into the weld puddle 145. For example, if the depth of the weld puddle 145 is shallow or the weld puddle 145 is at a temperature that will not instantly melt the filler wire 140, a small angle $\alpha$ may be desired to prevent the filler wire 140 from abutting against the bottom of the weld joint. If more depth of penetration is desired, the angle $\alpha$ is set to a larger angle. In addition, the desired penetration of the filler wire 140 can be dependent on the orientation of the filler wire 140 with respect to the heat source. For example, weld puddles are generally shallower in the front of the heat source than just behind the heat source because the weld puddle is just starting to form in the front. In contrast, the weld puddle 145 is fully formed behind the heat source. Accordingly, if the filler wire 140 enters the weld puddle 145 behind the heat source where the weld puddle 145 is fully formed, the angle $\alpha$ can be set higher to provide more penetration than if the filler wire 140 enters the weld puddle 145 in the front of the heat source where the weld puddle 145 can be shallow. Thus, the angle $\alpha$ can be different based on whether the filler wire 140 enters the weld puddle 145 in front of the heat source, behind the heat source or somewhere in between. For example, if the weld puddle is shallow and/or the filler wire 140 is oriented in front of the heat source, the angle $\alpha$ can be set and/or adjusted to a small angle, e.g., 5 to 30 degrees and, more preferably, 20 degrees to 30 degrees. If a larger depth of penetration is desired, e.g., because the filler wire 140 is behind the heat source, the angle $\alpha$ can be set or adjusted to a larger angle, e.g., 45 degrees to 90 degrees, and more preferably 60 degrees to 80 degrees.

Further, the angle $\alpha$ can be set and/or adjusted, e.g., manually and/or via robotic arm 210 and controller 195, based on a desired distance between the entry point of the filler wire 140 into the weld puddle 145 and point 220 where the heat source hits the weld puddle 145. For example, a smaller angle $\alpha$ allows the filler wire 140 to enter the weld puddle 145 at a point closer to point 220, which can allow the filler wire 140 to melt faster and/or allow the weld puddle 145 to cool more quickly. In addition, by entering the weld puddle 145 at a point closer to point 220 where the weld puddle is hotter, the preheating current through filler wire 140 can be reduced or eliminated, if desired. The angle α for the filler wire 140 can depend on various parameters such as the material type of the filler wire, material type of the workpiece, the depth of the weld puddle, the temperature of the weld puddle, the desired shape of the weld bead, the desired distance between the entry point of the filler wire into the weld puddle and the heat source, etc. In some embodiments, similar to the embodiments discussed above, while maintaining the filler wire 140 at the desired angle α, the filler wire 140 can be moved in at least one direction that includes at least one of a back and forth motion that is in-line with the travel direction 111, a back and forth motion that is transverse to the travel direction 111, a circular motion (clockwise or counter-clockwise), an elliptical motion (clockwise or counter-clockwise), a zig-zag motion, any combination of the above, or any other desired motion. In some embodiments, the setting and/or adjustment of the angle α of the filler wire 140 can be synchronized with the movement of the filler wire 140 in the at least one direction. In other embodiment, setting and/or adjustment of the angle α of the filler wire 140 is independent of the movement of the filler wire 140 in the at least one direction.

Of course, in some embodiments, more than one filler wire can have its respective angle α manually and/or automatically adjusted to a desired value. The respective angles α can be the same or different from each other. For example, a filler wire or wires can have a small angle α so that the filler wire(s) can be directed close to the point 220 while the other filler wire(s) can have a large angle α and be directed away from the point 220. The filler wires can be oriented around the high intensity heat source in any desired configuration, for example, on the same side, oriented 45 degrees apart, oriented 90 degrees apart, oriented 180 degrees apart, or some other desired orientation.

The sideways displacement or offset D with respect to a central longitudinal axis 215 of the weld puddle 145 allows for adjustment of where the filler wire material is deposited in the weld puddle 145. The offset D can be set and/or adjusted, e.g., manually and/or via robotic arm 210 and controller 195, based on where the filler wire 140 is to be deposited in the weld puddle 145. For example, in a welding operation with a weld joint, the offset D can be with respect to the weld groove axis. In a cladding operation, the offset D can be with respect to a center longitudinal axis of the cladding layer. In exemplary embodiments, the offset D can be adjusted based on deviations in the workpiece and/or the weld groove joint. For example, if feedback from a sensor that provides the profile of weld seam (e.g., a seam tracking sensor) and/or the profile of the workpiece indicates that there is a deviation in the weld joint (e.g., one of the workpiece plates has lifted compared to the other plate of the workpiece), the sensing and control unit 195 can be configured to bias the location where the filler wire 140 enter the weld puddle 145 to correct for the deviation (e.g., the location where the filler wire 140 enters the weld puddle is biased towards the plate that is not lifted by an appropriate offset D to compensate for the difference in level). If the workpiece plates are aligned properly, the offset can be zero and the filler wire 140 is deposited in the weld groove axis, i.e., without a bias to one side or the other. In cladding operations, a sensor can provide feedback of the profile of the workpiece being cladded and make appropriate adjustments to the offset D to account for any deviations or irregularities in the workpiece. In addition, as with the angle α, the offset D can also be set and/or adjusted, e.g., manually and/or via robotic arm 210 and controller 195 to obtain the desired shape, profile, height, size, or admixture of the weld bead (or clad bead) formed by the molten puddle 145.

Further, when the filler wire 140 is located on the side of the heat source with respect to the travel direction, the offset D can be set and/or adjusted, e.g., manually and/or via robotic arm 210 and controller 195, based on a desired distance between the entry point of the filler wire 140 into the weld puddle 145 and the point 220. In addition, as with the angle α, the offset D can depend on various parameters such as the material type of the filler wire, material type of the workpiece, the depth of the weld puddle, the temperature of the weld puddle, the desired shape of the weld bead, the desired distance between the entry point of the filler wire into the weld puddle and the point 220, etc. In some embodiments, similar to the embodiments discussed above, while maintaining the average offset of the filler wire 140 at a desired offset D, the filler wire 140 can be moved in at least one direction that includes at least one of a back and forth motion that is in-line with the travel direction 111, a back and forth motion that is transverse to the travel direction 111, a circular motion (clockwise or counter-clockwise), an elliptical motion (clockwise or counter-clockwise), a zig-zag motion, any combination of the above, or any other desired motion. In some embodiments, the setting and/or adjustment of the offset D of the filler wire 140 can be synchronized with the movement of the filler wire 140 in the at least one direction. In other embodiments, the setting and/or adjustment of the offset D of the filler wire 140 is independent of the movement of the filler wire 140 in the at least one direction.

Of course, in some embodiments, more than one filler wire can have its offset D manually and/or automatically adjusted to a desired value. The respective offsets D can all be the same, all different from each other or a combination of same and different based on the number of filler wires. For example, a first filler wire (or wires) can be controlled such that, on average, the first filler wire(s) has no displacement, i.e., in-line with respect to the central longitudinal axis 215, while a second filler wire (or wires) is controlled such that, on average, there is an offset D with respect to the central longitudinal axis 215.

In some embodiments, when more than one filler wire is used, the angle α and/or offset D of one or more filler wires can be adjusted while the angle α and/or offset D of the other filler wire(s) remain at a predetermined value(s). In some embodiments, while the high intensity energy source or the filler wire is only moved in the travel direction 111, the system 100 can be configured such that the other of the high intensity energy source or the filler wire is moved in at least one direction, where the at least one direction is at least one of a back and forth motion that is in-line with the travel direction 111, a back and forth motion that is transverse to the travel direction 111, a circular motion (clockwise or counter-clockwise), and an elliptical motion (clockwise or counter-clockwise), a zig-zag motion, any combination of the above, or any other desired motion. In some embodiments, the setting and/or adjustment of the offset D and/or the angle α of the filler wire 140 can be synchronized with the movement of the filler wire 140 and/or the heat source in the respective at least one direction. In other embodiment, setting and/or adjustment of the offset D and/or the angle α of the filler wire 140 is independent of the movement of the filler wire 140 and/or the heat source in the respective at least one direction.

In addition, in some embodiments where more than one filler wire is used, the wire feed speed of at least one filler wire can be different from the wire feed speed of the other filler wire(s). Thus, when more than one filler wire is used, the angle α, the offset D, and/or the wire feed speed of at least one filler wire can be different from the respective angle α, offset D, and/or wire feed speed of the other filler wire(s). By using different angles α, offsets D, and/or wire feed speeds, the chemistry of the weld puddle 145 and/or the weld bead profile can be modified as desired, e.g., based on the type of joint. In some embodiments, control of the wire feed speed(s) can be synchronized with the angle α and/or the offset D of the filler wire(s) and/or synchronized with the movement in the respective at least one direction of the filler wire and/or heat source. In other embodiments, control of the wire feed speed(s) is independent of the angle α, the offset D and/or the movement in the respective at least one direction of the filler wire and/or heat source.

Figure 6:
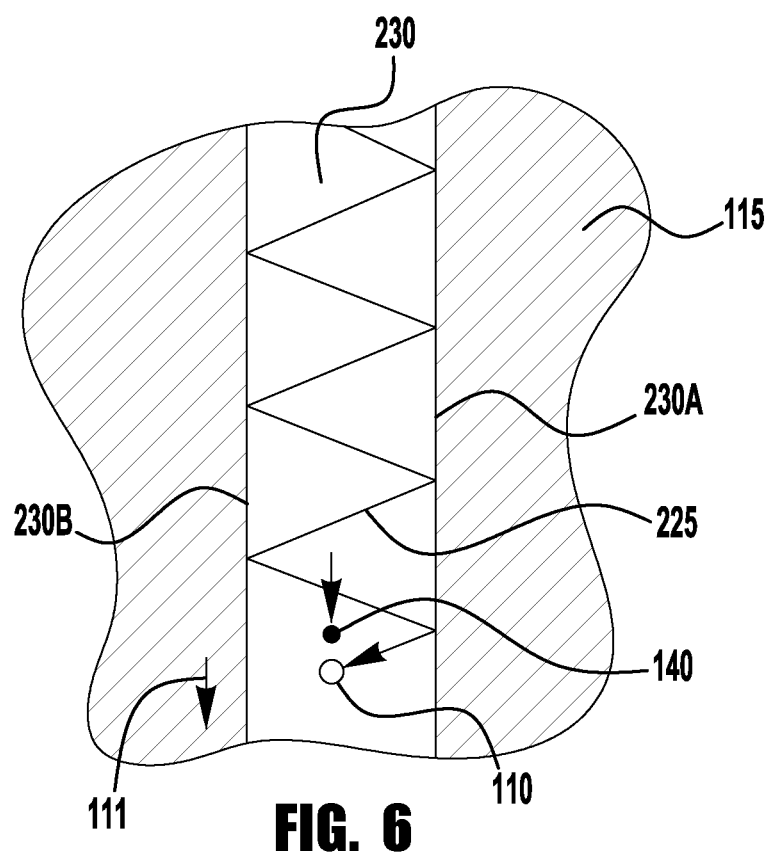
FIG. 6 illustrates an exemplary weave pattern that can be performed by the system of FIG. 1.

In some exemplary embodiments, depending on the type of weld joint, the heat source and/or one or more filler wires are moved in a weave pattern as the heat source and filler wire(s) are moved in the travel direction 111. The weave pattern moves the heat source and/or at least one filler wire in a predetermined pattern in the weld groove. For example, as shown in FIG. 6, the heat source, e.g., beam 110, can be moved in a weave pattern 225 that extends from one sidewall 230A of the weld joint 230 to the other sidewall 230B of the weld joint 230 (or from one outside cladding edge to the other when performing a cladding operation) while the welding advances in the travel direction 111. Alternatively, or in addition to the heat source, at least one filler wire, e.g., filler wire 140, can also be controlled to follow a respective weave pattern. In the embodiment of FIG. 6, the weave pattern 225 is a triangular wave and extends from one sidewall 230A to the other sidewall 230B. Of course, the weave pattern 225 is exemplary, and the weave pattern need not extend fully from one sidewall or outer clad edge to the other, i.e., the weave pattern can stop short of one sidewall/outer clad edge or stop short of both sidewalls/edges. In addition, the weave pattern type can be a sinewave, a triangular wave, a square valve, any combination thereof, or some other desired pattern. The weave pattern amplitude will depend on the weld groove gap and/or the desired profile of the weld bead or clad bead. For example, a bigger amplitude may be used to cover a large weld joint gap and/or to provide a flatter weld bead or clad bead. The weave pattern frequency determines the scanning speed and thus the interaction time between the heat source and/or the filler wire and the weld puddle at any given point on the weld puddle. In general, a higher frequency will mean less interaction time between the heat source and/or the filler wire and the weld puddle (i.e., less heat transferred to the weld puddle from the heat source and/or less filler material deposited from the filler wire at any given point for a given wire feed speed), and a lower frequency will mean more interaction time between the heat source and/or the filler wire and the weld puddle (i.e., more heat transferred to the weld puddle from the heat source and/or more filler material deposited from the filler wire at any given point for a given wire feed speed). In addition, the weave pattern can include a dwell time at one or more locations on the weave pattern path where, for a predetermined time period, the scanning speed of the heat source and/or filler wire slows down to a predetermined speed or even pauses. For example, the scanning of the heat source and/or filler wire can slow down or pause at the sidewalls of the weld groove to increase the heat input to the weld and/or increase the amount of filler material deposited in order to from a better weld along the sidewall. When performing cladding operations, the scanning of the heat source and/or filler wire can slow down or pause on the outside edges of a cladding layer to increase the heat input to the cladding layer and/or increase the amount of filler material deposited in order to provide a flatter clad bead and/or change the profile of the cladding layer.

In some exemplary embodiments, the movement in the respective at least one direction for the filler wire and/or heat source can be superimposed with the respective weave pattern(s). That is, while the heat source and/or the filler wire are being scanned to perform the weave pattern as discussed above, the heat source and/or the filler wire, as appropriate, are respectively being moved in at least one of a back and forth motion that is in-line with the travel direction 111, a back and forth motion that is transverse to the travel direction 111, a circular motion (clockwise or counter-clockwise), and an elliptical motion (clockwise or counter-clockwise), a zig-zag motion, any combination of the above, or any other desired motion. The combination of the weave pattern and the motion in the respective at least one direction for the heat source and/or the filler wire provides greater flexibility in obtaining the desired shape, profile, height, size, or admixture of the weld/clad bead formed by the molten puddle. In some embodiments, control of the weave patter of the filler wire and/or the heat source can be synchronized with the angle α and/or the offset D of the filler wire(s) and/or synchronized with the movement in the respective at least one direction of the filler wire and/or heat source. In other embodiments, control of the weave pattern is independent of the angle α, the offset D and/or the movement in the respective at least one direction of the filler wire and/or the heat source.

In some embodiments, the sensing and control unit 195 includes a sensor (not shown) that provides feedback to the control unit 195 concerning the profile of the weld bead WB, the profile of the molten puddle 145, the profile of the weld seam, and/or the profile of the workpiece. Based on the feedback, the control unit 195 can dynamically change the angle α, the offset D, the weave pattern(s) of the welding operation, wire feed speed(s), the movement in the respective at least one direction, or any combination thereof of at least one filler wire and/or the heat source to obtain the desired shape, profile, height, size, or admixture of the weld bead or clad bead formed by the molten puddle. Sensors that provide feedback of a profile of the weld puddle, weld bead, weld joint and/or the workpiece, such as, e.g., seam tracking sensors, are known in the art and thus will not be discussed in detailed. In some embodiments, the sensor, e.g., a seam tracking sensor, provides feedback to the control unit 195 concerning the weld joint gap, thickness, and/or orientation of the weld joint as the welding system moves in the travel direction, and the control unit 195 can dynamically change the angle α, the offset D, the weave pattern(s) of the welding operation, wire feed speed(s), the movement in the at least one direction, or any combination thereof of at least one filler wire and/or the heat source to obtain the desired shape, profile, height, size, or admixture of the weld bead or clad bead formed by the molten puddle. For example, if the feedback from the seam tracking sensor indicates that the weld gap has widened, the sensing and control unit 195 can be configured to perform, either in synchronization or independently, one or more of the following: increase a weave pattern to ensure the weld puddle 145 covers the gap, adjust the movement in the at least one direction of the filler wire and/or heat source to ensure the weld puddle covers the gap, increase the wire feed speed of the filler wire to ensure more filler material is added to the gap, decrease the travel speed to ensure the gap is covered, decrease the intensity of the heat source to ensure such that there is no blow through, decrease the angle α to ensure the filler wire does not penetrate as deeply, and/or adjust the offset D as appropriate. Conversely, if the sensor feedback indicates that the gap has decreased, the sensing and control unit 195 can be configured to perform, either in synchronization or independently, one or more of the following: decrease the weave pattern to ensure the weld puddle 145 does not go beyond the gap, adjust the movement in the at least one direction of the filler wire and/or the heat source, decrease the wire feed speed of the filler wire to ensure less filler material is added to the gap, increase the travel speed to ensure less filler material is added to the gap, increase the intensity of the heat source to ensure that there weld puddle is at the proper depth, increase the angle α to ensure the filler wire has the proper penetration, and/or adjust the offset D as appropriate. Seam tracking sensors are known in the art and thus will not be discussed in detailed.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method of controlling filler wire, the method comprising:
   heating at least one workpiece with a high energy heat source to create a molten puddle on a surface of said at least one workpiece;
   feeding a filler wire into said molten puddle;
   advancing each of said high energy heat source and said filler wire in a travel direction to deposit said filler wire on said at least one workpiece;
   moving at least one of said filler wire in at least a first direction and said high energy heat source in at least a second direction during said feeding of said filler wire and said advancing of said filler wire and said high energy heat source, where each of said at least first direction and said a least said second direction is different from said travel direction;
   setting at least one of an angle of entry of said filler wire into said molten puddle with respect to a surface of said molten puddle and an offset of said filler wire with respect to a longitudinal axis of said molten puddle; and
   controlling at least one of said movement of said filler wire in said at least first direction and said movement of said high energy heat source in said at least second direction with controlling said setting of at least one of said angle and said offset to obtain a desired shape, profile, height, size, or admixture of a bead formed by said molten puddle.

2. The method of claim 1, wherein each of said movement in said at least first direction and said movement of said high energy heat source in said at least second direction includes at least one of a back and forth motion that is in-line with said travel direction, a back and forth motion that is transverse to said travel direction, a circular motion, an elliptical motion, and a zig-zag motion.

3. The method of claim 2, further comprising:
   preheating said filler wire to at or near a melting temperature of said filler wire prior to said filler wire entering said molten puddle.

4. The method of claim 2, wherein said high energy heat source comprises a laser which directs a laser beam onto said at least one workpiece to create said molten puddle.

5. The method of claim 2, further comprising scanning at least one of said filler wire and said heat source in a weave pattern.

6. The method of claim 5, wherein said scanning of said at least one of said heat source and said filler wire during said weave pattern includes a dwell time that slows down or pauses the scanning at one or more locations on said weave pattern.

7. The method of claim 2, further comprising controlling a wire feed speed of said filler wire to obtain said desired shape, profile, height, size, or admixture of said bead formed by said molten puddle.

8. The method of claim 2, further comprising:
   feeding a second filler wire into said molten puddle;
   advancing said second filler wire in said travel direction to deposit said second filler wire on said at least one workpiece;
   moving said second filler wire in at least a third direction during said feeding of said second filler wire and said advancing of said second filler wire where said at least third direction is different from said travel direction; and
   setting at least one of an angle of entry of said second filler wire into said molten puddle with respect to said surface of said molten puddle and an offset of said second filler wire with respect to said longitudinal axis of said molten puddle;
   wherein said controlling to obtain said desired shape, profile, height, size, or admixture of said bead formed by said molten puddle further comprises controlling said movement of said second filler wire in said at least third direction, and
   wherein said movement of said second filler wire in said at least third direction includes at least one of a back and forth motion that is in-line with said travel direction, a back and forth motion that is transverse to said travel direction, a circular motion, an elliptical motion, and a zig-zag motion.

9. The method of claim 8, further comprising controlling at least one of a first wire feed speed of said filler wire and a second wire feed speed of said second filler wire to affect at least one of a chemistry of said weld puddle and said desired shape, profile, height, size, or admixture of said bead.

10. The method of claim 1, wherein said controlling at least one of said movement in said at least first direction and said movement in said at least second direction is synchronized with said controlling of said setting of at least one of said angle and said offset.

11. The method of claim 1, wherein said controlling at least one of said movement in said at least first direction and said movement in said at least second direction is independent of said controlling of said setting of at least one of said angle and said offset.

12. The method of claim 1, further comprising:
   controlling, based on a feedback from a sensor, at least one of said movement in said at least one direction of said filler wire, said movement in said at least second direction of said high energy heat source, a wire feed speed of said filler wire, a travel speed in said travel direction, an intensity of said high energy heat source, said angle of said filler wire, and said offset of said filler wire.

13. A system for controlling a filler wire, the system comprising:
a high intensity energy source configured to heat at least one workpiece to create a molten puddle on a surface of said at least one workpiece;
a filler wire feeder configured to feed a filler wire into said molten puddle;
a travel direction controller configured to advance each of said high intensity energy source and said filler wire in a travel direction to deposit said filler wire on said at least one workpiece; and
a controller configured to move at least one of said filler wire in at least a first direction and said high intensity energy source in at least a second direction during said feeding of said filler wire and said advancing of said filler wire and said high intensity energy source, where each of said at least first direction and said second direction are is different from said travel direction,
wherein said controller is configured to set at least one of an angle of entry of said filler wire into said molten puddle with respect to a surface of said molten puddle and an offset of said filler wire with respect to a longitudinal axis of said molten puddle, and
wherein said controller is configured to control at least one of said movement of said filler wire in said at least first direction and said movement of said high intensity energy source in said at least second direction with controlling said setting of at least one of said angle and said offset to obtain a desired shape, profile, height, size, or admixture of a bead formed by said molten puddle.

14. The system of claim 13, wherein said each of said movement of said filler wire in said at least first direction and said movement of said high intensity energy source in said at least second direction includes at least one of a back and forth motion that is in-line with said travel direction, a back and forth motion that is transverse to said travel direction, a circular motion, an elliptical motion and a zig-zag motion.

15. The system of claim 14, further comprising:
a wire power supply configured to preheat said filler wire to at or near a melting temperature of said filler wire prior to said filler wire entering said molten puddle.

16. The system of claim 14, wherein said high intensity energy source comprises a laser that is configured to direct a laser beam onto said at least one workpiece to create said molten puddle.

17. The system of claim 14, wherein said controller is configured to scan at least one of said filler wire and said high intensity energy source in a weave pattern.

18. The system of claim 17, wherein said scanning of said at least one of said heat source and said filler wire during said weave pattern includes a dwell time that slows down or pauses the scanning at one or more locations on said weave pattern.

19. The system of claim 14, further comprising controlling a wire feed speed of said filler wire to obtain said desired shape, profile, height, size, or said admixture of said bead formed by said molten puddle.

20. The system of claim 14, further comprising:
a second filler wire feeder configured to feed a second filler wire to said molten puddle, said travel direction controller further configured to advance said second filler wire in said travel direction to deposit said second filler wire on said at least one workpiece,
wherein said controller is configured to move said second filler wire in at least a third direction during said feeding of said second filler wire and said advancing of said second filler wire, where said at least third direction is different from said travel direction,
wherein said controller is configured to set at least one of an angle of entry of said second filler wire into said molten puddle with respect to said surface of said molten puddle and an offset of said second filler wire with respect to said longitudinal axis of said molten puddle,
wherein said controlling to obtain said desired shape, profile, height, size, or admixture of said bead formed by said molten puddle further comprises controlling said movement of said second filler wire in said at least third direction, and
wherein said movement of said second filler wire in said at least third direction includes at least one of a back and forth motion that is in-line with said travel direction, a back and forth motion that is transverse to said travel direction, a circular motion, an elliptical motion, and a zig-zag motion.

21. The system of claim 20, wherein said controller is configured to control at least one of a first wire feed speed of said filler wire and a second wire feed speed of said second filler wire to affect at least one of a chemistry of said weld puddle and said desired shape, profile, height, size, or admixture of said bead.

22. The system of claim 13, wherein said controller is configured such that at least one of said movement in said at least first direction and said movement in said at least second direction is synchronized with said controlling of said setting of at least one of said angle and said offset.

23. The system of claim 13, wherein said controller is configured such that at least one of said movement in said at least first direction and said movement in said at least second direction is done independently of said controlling od said setting of at least one of said angle and said offset.

24. The system of claim 13, further comprising a sensor to provide feedback of a profile of at least one of said molten puddle, said weld bead, a weld joint, and said workpiece,
wherein, based on said feedback, said controller is configured to control at least one of said movement in said at least one direction, said movement in said at least second direction, a wire feed speed of said filler wire, a travel speed in said travel direction, an intensity of said high intensity energy source, said angle of said filler wire, and said offset of said filler wire.

25. The method of claim 5, wherein the weave pattern extends from a first sidewall to a second sidewall opposite the first sidewall of a weld groove that contains the molten puddle.

26. The system of claim 17, wherein the weave pattern extends from a first sidewall to a second sidewall opposite the first sidewall of a weld groove that contains the molten puddle.

* * * * *